P. MORIN.
SAW SET.
APPLICATION FILED MAR. 29, 1920.

1,416,374.

Patented May 16, 1922.

INVENTOR:
Philiace Morin
BY
Pierre James
ATTORNEY

UNITED STATES PATENT OFFICE.

PHILIACE MORIN, OF SEATTLE, WASHINGTON, ASSIGNOR TO MORIN SAW GUAGE MFG. CO., OF SEATTLE, WASHINGTON, A CORPORATION OF WASHINGTON.

SAW SET.

1,416,374.      Specification of Letters Patent.      Patented May 16, 1922.

Application filed March 29, 1920. Serial No. 369,521.

*To all whom it may concern:*

Be it known that I, PHILIACE MORIN, a citizen of the United States, residing at Seattle, in the county of King and State of Washington, have invented certain new and useful Improvements in Saw Sets, of which the following is a specification.

This invention relates to saw-sets and, more especially, to improvements to the implement of this type illustrated and described in United States Patent No. 736,534 issued August 18, 1903, to Joseph Morin.

The object of my improvements is the perfecting of devices of this character to render the same more serviceable and convenient to operate and afford regulating means whereby saw-teeth may be more uniformly set to predetermined extents and more expeditiously than hitherto.

The invention consists in the novel construction, arrangement and combination of parts as will be hereinafter described and claimed.

In the accompanying drawings, Figure 1 is a plan view of a saw setting tool embodying my improvements.

Figure 1:
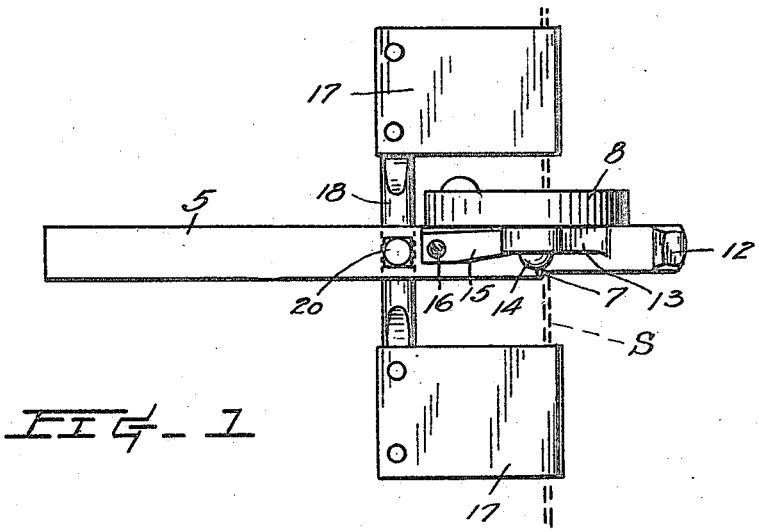

The reference numeral 5 designates the stock of the implement, preferably of a rectangular bar shape.

The front end of said stock is formed to provide an anvil having a face 6 rectangular to the longitudinal axis of the stock and a bevel face 7 in a plane inclined from the surface of the face 6.

Rigidly secured to one side of the forward portion of the stock, and forming therewith the tool-frame or body, is a bracket member 8 of an inverted U-shape with one of its legs, as 9, extending downwardly and terminating, as shown, in a block element 10. This block element is disposed at a distance from the body face 6 to afford a slot 11 in front of the latter to receive a saw blade, as indicated by broken lines S in Fig. 2.

12 represents a block constituting a swage with respect to work juxtaposed with the anvil face 6, said swage being provided with an upwardly extending arm 13 which is pivotally connected to a stud 14 protruding from the upper portion of the bracket member 8.

Figure 2:
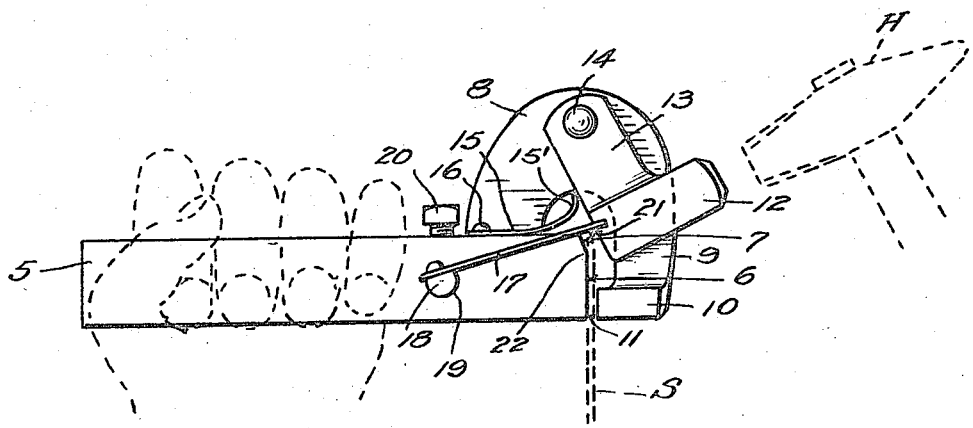
Fig. 2 is a side elevation thereof.

15 represents a leaf spring disposed longitudinally upon the stock 5 and has its rear end secured to the latter by means of a screw 16. A forward curved end 15' of the spring engages against the swage arm 13 to yieldingly hold the swage, as shown in Fig. 2, away from a saw against which the stock face 6 is placed.

Included in the invention are wings comprising plates 17 secured to the ends of a rod 18 which extends through and is rotatable in a transversely arranged hole 19 provided in the stock member 5. A set screw 20 engaging in a threaded hole provided in said stock member serves to secure the rod 18 in a position to present the under surfaces 21 of the wings above the anvil and at a distance from the angle 22 between the stock faces 6 and 7 equal to the distances from the points of the respective cutting teeth whereat they are to be bent to afford the requisite set.

Figure 3:
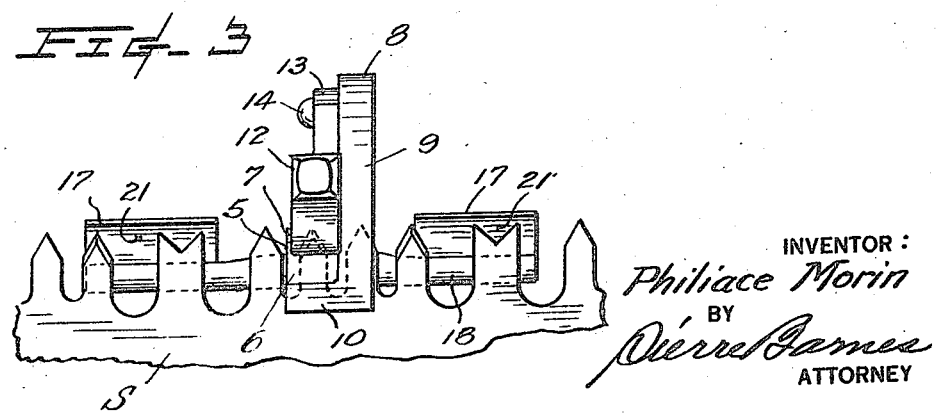
Fig. 3 is an end view of the tool shown applied.

For operation, a saw S is held in a vise, the stock 5 of the device is grasped in one hand of the operator and an ordinary hammer, as H, is taken in his other hand. The operator then places the implement over the saw which extends upwardly through the slot 11 until arrested by the wings 17 contacting with the teeth of the saw as shown in Figs. 2 and 3. The implement is then brought into position to present a tooth against the face 6 whereupon the operator delivers a blow with the hammer against the swage 12 thereby causing the referred to tooth to be bent at the angle 22 and against the anvil face 7 to effect a desired set of the tooth.

The alternate cutting teeth throughout the length of the saw or, at least, those requiring to be set are successively treated in the same manner, the saw is then turned around in the vise and the remaining cutting teeth are similarly set from the other side of the saw.

The construction and operation of the invention will be understood from the foregoing description.

It is to be noted, however, that the wings when seating upon the points of the teeth at opposite sides of the one which is to be set obviates any possibility of the implement being held in an inclined or tilted position toward either end of the saw and whereby in the setting of the teeth the same are bent squarely, so to speak, and ensures the work being properly accomplished with greater facility and uniformity than would otherwise obtain. The use of the spring 15, moreover, tends to expedite the operation by reason of its normally retaining the swage 12 in a position whereat there will be no interference between the swage and the teeth when shifting the implement from one tooth to another without the necessity of the operator withdrawing, with one of his hands, the swage clear of the teeth when adjustably moving the device.

It has been found, furthermore, in the practical use of the device that tooth setting is more efficiently accomplished when momentum may be imparted to the swage before encountering a tooth to deliver a forcible striking blow thereto rather than having the swage be primarily in contact with the work.

What I claim, is—

1. In an implement of the character described, the combination with the implement body comprising stock and bracket members rigid with each other, one end of said stock being provided with two plane surfaces in angular relations with each other, and a swage pivotally connected to said bracket member, of adjustable means connected to said body member and arranged to be supported by the points of a saw being operated upon for positioning said stock to have the angle of said surfaces located at a predetermined distance from a line projected through the points of the saw teeth.

2. In an implement of the character described, the combination with the implement body consisting of stock and bracket members, one end of said stock members being provided with an inclined anvil face, and a swage pivotally connected to said bracket member, of a bar rotatable in a hole extending transversely through said stock member, wing plate elements secured to the ends of said bar at opposite sides of the body, and means engaging said bar in selected rotary positions to the stock member for securing said plate elements at substantially right angles to the plane of said anvil face and at a selected distance from the lower edge of such face.

Signed at Seattle Washington, this 23rd day of March 1920.

PHILIACE MORIN.

Witnesses:
PIERRE BARNES,
ELIZABETH JOHNSON.